United States Patent [19]
Potucek

[11] 3,885,669
[45] May 27, 1975

[54] ROTARY ENTRY FASTENER CARRIER AND STRIP

[75] Inventor: Frank R. Potucek, Des Plaines, Ill.

[73] Assignee: Duo-Fast Corporation, Franklin Park, Ill.

[22] Filed: Apr. 29, 1974

[21] Appl. No.: 464,913

[52] U.S. Cl.................................. 206/338; 206/347
[51] Int. Cl............................................. B65d 85/24
[58] Field of Search ........ 85/17; 206/230, 338, 343, 206/345, 346, 347

[56] References Cited
UNITED STATES PATENTS

| | | | |
|---|---|---|---|
| 3,438,487 | 4/1969 | Gallee et al. | 206/347 |
| 3,450,255 | 6/1969 | Mosetich | 206/347 |
| 3,774,755 | 11/1973 | Cast et al. | 206/346 |
| 3,812,961 | 5/1974 | Merrick et al. | 206/338 |

*Primary Examiner*—William T. Dixson, Jr.
*Assistant Examiner*—Steven E. Lipman
*Attorney, Agent, or Firm*—Mason, Kolehmainen, Rathburn & Wyss

[57] ABSTRACT

A fastener strip includes a series of rotary entry fasteners supported by a unitary flexible plastic carrier including a web portion and a plurality of spaced pairs of tabs. One fastener is supported by slots in the tabs of each pair. The shank of each fastener includes a threaded segment received in a slot sized between the major and minor thread diameters. The legs defined in the tab to each side of the slot are urged by the threads in opposite directions along the shank to provide positive mechanical holding action.

17 Claims, 6 Drawing Figures

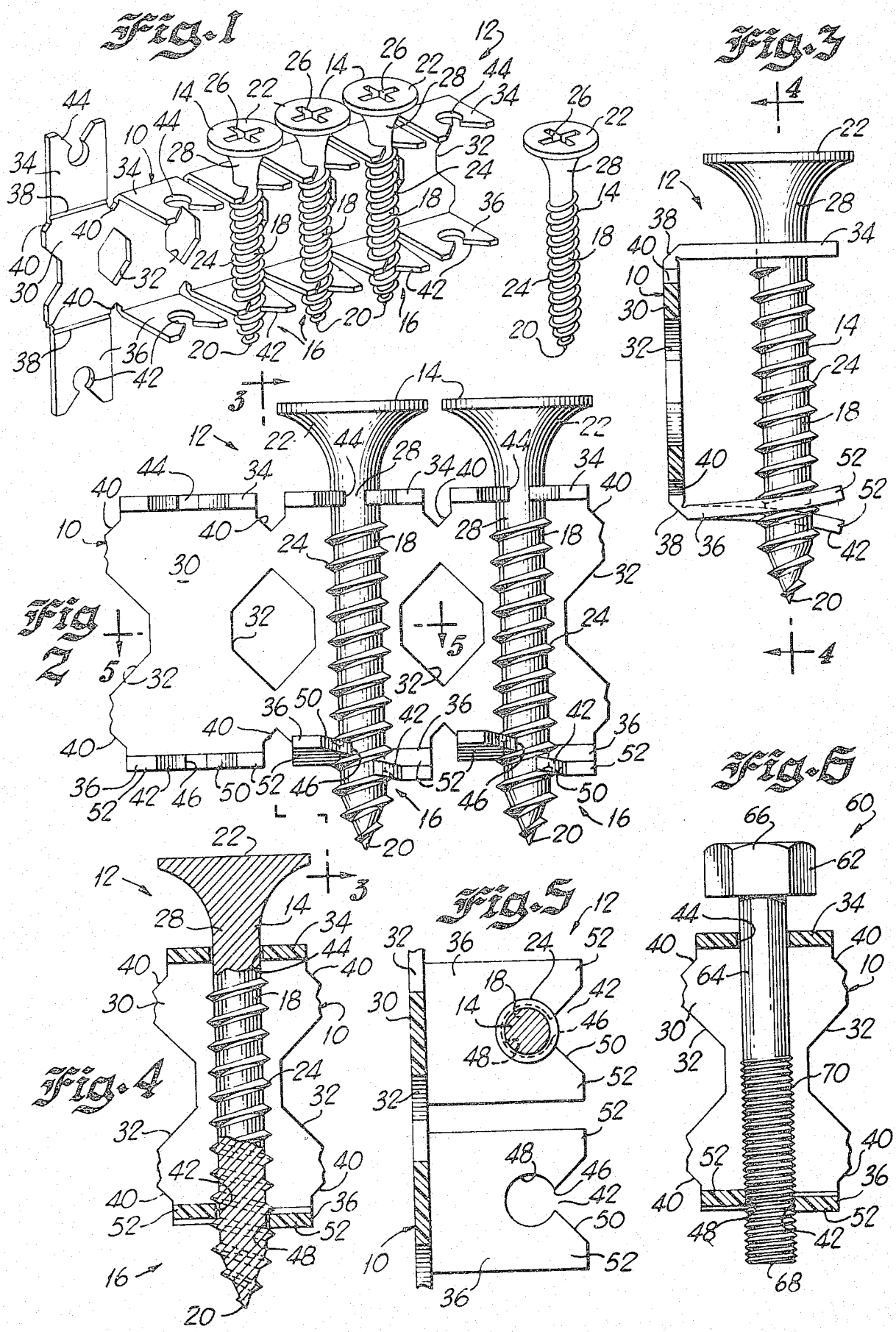

ROTARY ENTRY FASTENER CARRIER AND STRIP

The present invention relates to an improved carrier for holding a series of threaded fasteners in a strip from which the fasteners are capable of being fed to and driven by a power fastener driving tool.

In a copending application entitled "Fastener Feed Apparatus And Method", Ser. No. 412,684, filed Nov. 5, 1973, there is disclosed a feed assembly for supplying rotary entry fasteners to be driven by a tool such as a power screwdriver. Certain improvements in this assembly are described in an application of John R. Nasiatka entitled "Rotary Entry Fastener Driving Tool", Ser. No. 464,914, filed on Apr. 29, 1974. In the devices disclosed in these two applications, a series of rotary entry fasteners are supplied in a strip and are driven one at a time from the strip by a power screwdriver. The present invention relates to improvements in carriers for supporting threaded or rotary entry fasteners, and to improvements in strips of fasteners including the improved carrier.

Nails and similar fasteners adapted for driving by an abrupt impact in a pneumatic nailer or similar tool have been provided in strip form in the past. For example, reference may be had to U.S. Pat. No. 3,438,487 - Gallee et al. and to U.S. Pat. No. 3,450,255 - Mosetich for examples of known nail strips and carriers. These carriers include an elongated web portion together with tabs extending from the edges of the web, the tabs having slots within which the nails are frictionally grasped. The slots are of a width substantially equal to or slightly larger than the nail shank diameters and are intended to provide frictional retention of the nail shanks. The nails are adapted to be driven one at a time from the carrier, at which time they are forced from the slotted tabs.

In addition to the standard smooth shank nails illustrated in the above identified Gallee et al and Mosetich patents, the carriers there disclosed have been used with special purpose, deformed shank nails, such as ring shank and screw shank nails. In all such prior arrangements, the slots for holding the nails have been sized approximately equal to or slightly larger than the maximum nail diameter received in the slot to prevent inadvertent displacement of the nail relative to the carrier during loading of the nail into the slots. In the practice of the inventions of the two patents referred to above, it has proven difficult to attain the desired positive retention of a nail in the carrier.

It is an object of the present invention to provide an improved carrier for rotary entry fasteners having threaded portions, and to provide an improved holding slot configuration cooperating in novel manner with the fastener threads. Another object is to provide a carrier having the several important advantages of the nail strip carrier disclosed in the above designated Gallee et al and Mosetich patents, while overcoming difficulties heretofore encountered in obtaining sufficient mechanical retention of the fastener.

In brief, in accordance with the present invention there is provided a carrier for supporting a series of fasteners each having threads on at least a portion of its shank. The carrier comprises an elongated integral body of flexible plastic material including a web portion and pairs of tabs extending from opposite edges of the web. Each tab is provided with a slot structure, and a fastener is supported by frictional engagement with the slots of each pair of tabs.

In accordance with an important feature of the invention, the threads of the fastener shank are received into a slot of at least one of the tabs. This slot has a maximum width intermediate the major and minor thread diameters. As the fastener is inserted into the slot, the opposed edges of the slot are urged in opposite directions along the axis of the shank and the shank is positively and mechanically retained within the tab.

The invention, together with the above and other objects and advantages, may be best understood with reference to the following detailed description of the embodiments of the invention illustrated in the drawing, wherein:

FIG. 1 is a perspective view of a segment of a strip of fasteners constructed in accordance with the present invention;

FIG. 2 is a front elevational view, on an enlarged scale, of a part of the strip of FIG. 1;

FIG. 3 is a sectional view taken along the line 3—3 of FIG. 2;

FIG. 4 is a sectional view taken along the line 4—4 of FIG. 3;

FIG. 5 is a sectional view taken along the line 5—5 of FIG. 2; and

FIG. 6 is a view somewhat similar to FIG. 4 and illustrating an alternative embodiment of the present invention.

Having reference now to the drawing, and initially to FIGS. 1-5, there is illustrated a carrier generally designated as 10 used in the assembly of a strip of fasteners generally designated as 12, the carrier 10 and the strip 12 embodying the principles of the present invention. The strip 12 includes, in addition to the carrier 10, a plurality of rotary entry fasteners 14 supported by the carrier 10 for sequential feeding to and driving by a rotary entry fastener driving mechanism. In accordance with an important feature of the invention, the carrier 10 is provided with a novel holding structure generally designated by the reference numeral 16 by which each screw 14 is positively held in position in the strip 12.

Examples of fastener feeding and driving structures with which the strip 12 can be used may be found in the copending application and the contemporaneously filed application of John R. Nasiatka, both identified above. Reference may be had to these copending applications for a complete description of the feeding and driving structure and its operation.

The principles of the present invention are applicable to fastener strips including rotary entry fasteners of many types. In the embodiment of the invention illustrated in FIGS. 1-5, each fastener 14 is of the type commonly known as a drywall screw useful, for example, for fastening drywall panels to metal studs. More specifically, each screw 14 includes a shank 18 extending between a tip or point 20 and a head 22. Extending from the tip 20 throughout most of the length of the shank 18 is a thread structure 24. In the illustrated arrangement the head 22 is of the so-called bugle type and includes a suitable drive recess or slot structure 26 for engagement by the driver bit of a fastener driving tool. In the illustrated arrangement, a nonthreaded shank portion 28 extends between the thread structure 24 and the head 22.

Proceeding now to a more detailed description of the carrier 10 of the present invention, this carrier comprises a unitary body of a suitable resilient and flexible material such as an extruded plastic or the like. A web portion 30 of the carrier 10 extends throughout its length, and the web is provided with a series of openings 32 by which the strip 12 may be advanced in increments in a fastener feeding assembly.

In order to support the fasteners 14 along the carrier 10, the carrier is provided with a series of upper tabs 34 and a similar series of lower tabs 36 extending from opposite edges of the web 30. Each tab 34 and 36 is spaced apart from its neighbors and is joined to the web 30 by a reduced thickness, integral hinge portion 38 to the end that each tab may be moved independently of the others. Notches 40 are provided between adjacent tabs 34 and adjacent tabs 36, the notches 40 being aligned with the openings 32 to facilitate severing of the web 30 into segments of desired length. Reference may be had to the above identified Gallee et al and Mosetich patents for a complete description of the function of openings 32 and notches 40.

Prior to loading of fasteners 14 into the carrier 10, the tabs 34 and 36 are pivoted out of the plane of the web 30 to extend in the same direction and generally transversely of the web 30. Each upper tab 34 cooperates with one lower tab 36 to form a pair of tabs for holding a single fastener 14 on the carrier 10. Each lower tab 36 is provided with a slot structure 42 cooperating with the thread structure 24 of the fastener 14 to provide the novel holding structure 16 of the present invention. Each upper tab 34 is provided with a slot structure 44 which, in the embodiment of the invention illustrated in FIGS. 1–5, receives the nonthreaded shank portion 28 of the fastener 14.

Referring more specifically now to the configuration of the slot structure 42, this structure includes a relatively narrow neck portion 46 located between an enlarged shank engaging portion 48 and an entrance bevel portion 50. The entrance bevel portion 50 is somewhat funnel shaped and serves to guide the fastener shank 18 as it is loaded into the carrier 10. The neck portion is smaller than the minor thread diameter of the thread structure 24 and, after loading of a fastener 14, retains the fastener from being pulled out of the slot structure 42. A pair of leg portions 52 are defined in the tab 36, one to each side of the slot structure 42.

In accordance with an important feature of the present invention, the shank engaging portion 48 of the lower slot structure 44 is sized between the major and minor diameters of the thread structure 24. In the illustrated arrangements, the portion 48 is generally circular in shape and has a diameter roughly intermediate the minor thread diameter (i.e., the root-to-root thickness) and the major thread diameter (i.e., the crest-to-crest thickness) of the thread structure 24. As a result of this novel configuration, as the thread structure 24 is pushed through the entrance bevel 50 and through the neck portion 46 into the shank engaging portion 48, the threads of the thread structure 24 engage the sides of the slot structure 42. The legs 52 are cammed in opposite directions along the shank of the screw by engagement with the threads. In other words, one leg 52 is displaced from its normal position toward the head 22 of the screw, while the other leg 52 is urged in the opposite direction toward the tip 20.

As a consequence of this novel holding arrangement, the thread structure 24 of the shank 18 is mechanically and positively held in the slot structure 42. Not only does the overlap or interference between the portion 48 and the thread structure 24 firmly resist any tendency for the screw to move axially through the structure 42, but also it is believed that the action of the legs 52 against the shank 18 tends to apply a rotational force to the fastener 14. Because the fastener cannot rotate due to also being held in the upper tab 34, there is provided an arrangement of balanced forces which results in optimum holding of the fastener 14 on the strip 12.

If desired, as in the illustrated arrangement, the upper slot structure 44 may be identical with the lower slot structure 42. Since the two slot structures are similar, the upper structure 44 is not described in detail herein. In the illustrated arrangement, the upper slot structure 44 engages the nonthreaded portion 28 of the shank 18. As can best be seen in FIG. 4, the shank engaging portion 48 of the upper slot structure 44 is very slightly larger than the diameter of the nonthreaded shank portion 28. However, the neck portion 46 is substantially smaller than this portion of the shank so that the fastener 14 cannot be moved transversely out of the slot structure 44. If even more secure fastener retention is desired, or if the fastener shank is threaded throughout its length, the upper slot structure can also be engaged with the fastener threads.

In the embodiment of the invention illustrated in FIGS. 1–5, each fastener 14 comprises a one inch drywall screw. The thread structure 24 is a single lead thread with eighteen threads per inch, the pitch of the threads thus being roughly 0.056 inch. The major diameter of the thread structure is about 0.150 inch, while its minor diameter is about 0.10 inch. The carrier is fabricated of material having a thickness of about 0.035 inch, and thus this is the thickness of the tabs 34 and 36. The width of the slot structure 42 at the neck portion 46 is about 0.045 inch, while the diameter of the portion 48 is about 0.120 inch. These dimensions are set forth as an example of one embodiment of the invention only, and are not intended to limit the scope of the present invention.

Because in the arrangement of FIGS. 1–5 a single lead thread is used, and because the thread pitch exceeds the thickness of the tabs 36, the edge of the portion 48 assumes a helical shape within the root of the threads. However, this particular configuration is not a necessity in obtaining the desired positive holding action of the present invention arising from the tendency of the thread structure to urge the legs 52 in opposite directions along the axis of the fastener shank. For example, where a fastener having a multiple lead thread is used, the pitch may exceed the ability of the legs 52 to conform to the root helix. In this case, the edge of the portion 48 may overlie, or intersect, one or more thread crests while still providing the desired mechanical holding action.

It is also not necessary that the thickness of the tabs 34 and 36 be smaller than the pitch of the fastener threads. With reference now to FIG. 6, there is illustrated a fastener strip generally designated by the reference numeral 60 comprising the carrier 10 supporting a fastener 62. The fastener 62 includes a shank portion 64 extending between a hex head 66 and a leading end 68. The shank 64 is provided with a fine thread structure 70 having a pitch substantially smaller than the thickness of the tab 36. Consequently, the edges of the slot structure 42 overlie more than one crest of the thread structure 70. It should be noted that the diameter of the shank engaging portion 48 is smaller than the major thread diameter and larger than the minor thread diameter. It should also be noted that due to biting or cutting of the thread crests into the material of the carrier 10, and/or to outward spreading of the legs 52, there is provided the desired camming action of the legs 52 in opposite directions along the shank 64.

While the present invention has been described with reference to details of the illustrated embodiments, it should be understood that such details are not intended to limit the invention as defined in the following claims.

What is claimed and desired to be secured by Letters Patent of the United States is:

1. A strip of rotary entry fasteners comprising a flexible plastic carrier including a web and pairs of tabs extending generally transverse to the web from opposite edges thereof, slots in the tabs, a plurality of fasteners having shanks frictionally and releasably retained in said slots, each shank including a threaded portion supported by a first tab of each pair and a spaced portion supported by a second tab of each pair, and the slot of each first tab having a fastener engaging portion narrower than the major thread diameter and wider than the minor thread diameter.

2. The strip of claim 1, the portions of each first tab to each side of its slot being urged in opposite directions along the fastener shank by engagement with said threaded portion.

3. The strip of claim 2, the slot of each first tab further including an entrance bevel portion and a neck portion disposed between said bevel portion and said fastener engaging portion.

4. The strip of claim 3, said neck portion being narrower than the minor thread diameter.

5. The strip of claim 4, the slot of each second tab of each pair engaging a nonthreaded shank portion of one said fastener.

6. The strip of claim 1, an opening in said web corresponding to each pair of tabs.

7. The strip of claim 6, notches along the opposite edges of said web between adjoining tabs and aligned with said openings.

8. A carrier for a series of fasteners having at least partly threaded shanks, said carrier comprising an integral body of flexible plastic material including an elongated web portion and a plurality of pairs of spaced, parallel tabs extending generally transversely from opposed edges of the web portion, each tab including an open ended slot receiving a fastener shank through the open end thereof, the slot of at least one tab of each pair receiving a threaded portion of the shank and having a maximum width between the major and minor thread diameters.

9. The carrier of claim 8, the slot of the other tab of each pair receiving a nonthreaded portion of said shank and having a width at least substantially as large as the diameter of the nonthreaded portion.

10. The carrier of claim 8, a series of openings in said web, said openings each corresponding to one said pair of tabs.

11. The carrier of claim 8, notches extending inwardly from the edges of said web between adjacent tabs.

12. A combination of a carrier and a series of fasteners, said combination comprising:
a plurality of similar fasteners each having a shank, head means and tip means at opposite ends of said shank, and a thread structure on said shank;
an elongated web of flexible plastic material having a width smaller than the length of said shanks;
a series of spaced upper tabs integral with and extending from one edge of said web;
a series of spaced lower tabs integral with and extending from the opposite edge of said web;
said upper and lower tabs extending to the same side of and generally transversely of said web;
a thread receiving slot in each said lower tab having an entrance neck portion narrower than the minor thread diameter and an enlarged portion inward of said neck portion having a diameter larger than the minor thread diameter and smaller than the major thread diameter;
each thread receiving slot engaging the thread structure of one said fastener, the opposed edges of said thread receiving slot being displaced in opposite directions along the axis of the fastener shank by engagement with said thread structure; and
an additional slot in each upper tab receiving a portion of each shank spaced from said lower tab.

13. In combination, an elongaged flexible plastic carrier strip, and a series of rotary entry fasteners having at least partly threaded shanks supported generally parallel with one another by said strip at generally equidistant locations along the strip, the central axis of each said fastener intersecting the longitudinal axis of said strip, said carrier including a plurality of similar holding structures spaced along said strip each for holding one said fastener, each said holding structure comprising spaced first and second holding means engageable with the fastener shank at spaced locations therealong, at least one said holding means engaging a threaded portion of said shank, said one holding means comprising a tab member integral with said strip and having an open ended slot defining a pair of legs flanking said slot, the width of said slot being smaller than the major thread diameter and larger than the minor thread diameter of said shank, said shank being inserted into said slot and the threads of said shank urging said legs in opposite directions along the axis of said shank and applying a rotational force to said shank, said other holding means engaging said shank and preventing said rotational movement whereby said shank is held in resilient tension between said first and second holding means.

14. The combination of claim 13, said slot comprising a neck portion adjacent its open end having a width smaller than the minor thread diameter of said shank, and an enlarged fastener retaining portion inwardly of said neck portion.

15. The combination of claim 14, said enlarged portion being generally circular in shape and having a diameter roughly intermediate said major and minor thread diameters.

16. The combination of claim 15, said tab having a thickness smaller than the thread pitch of said shank.

17. The combination of claim 15, said tab having a thickness greater than the thread pitch of said shank.

* * * * *